United States Patent [19]

Bestock

[11] Patent Number: 5,363,449
[45] Date of Patent: Nov. 8, 1994

[54] PERSONAL IDENTIFICATION ENCRYPTOR AND METHOD

[75] Inventor: Ralph R. Bestock, Los Altos, Calif.

[73] Assignee: Tandem Computers Incorporated, Cupertino, Calif.

[21] Appl. No.: 29,833

[22] Filed: Mar. 11, 1993

[51] Int. Cl.⁵ .............................................. H04L 9/32
[52] U.S. Cl. ...................................... 380/23; 380/9; 380/25; 380/49
[58] Field of Search .................. 380/9, 23, 24, 25, 49, 380/50, 4, 33, 42, 21, 29, 46

[56] References Cited

U.S. PATENT DOCUMENTS

| | | | |
|---|---|---|---|
| 4,064,558 | 12/1977 | Hughes et al. | 380/50 X |
| 4,520,232 | 5/1985 | Wilson | 380/49 X |
| 4,605,820 | 8/1986 | Campbell, Jr. | 380/24 |
| 4,668,103 | 5/1987 | Wilson | 380/50 X |
| 4,870,683 | 9/1989 | Atalla | 380/56 |

Primary Examiner—Bernarr E. Gregory
Attorney, Agent, or Firm—Graham & James

[57] ABSTRACT

A method and apparatus for allowing a user to select and encrypt a Personal Identification Number (PIN) from a remote location without requiring clear transfer of the user-selected PIN and the account number during a single communication is disclosed. The preferred embodiment includes a host computer connected by a modem to a telephone line, along with appropriate communication software, and a security module connected to the host via a secure communication path. The security module generates an encrypted PIN using the user-selected PIN and a sequence number generated by the host. The security module can also processes the encrypted PIN and user account number to generate a Pin Verification Number (PVN) or other user authorization code. The PVN is subsequently used by a transaction system to verify the identity of the authorized user.

21 Claims, 5 Drawing Sheets

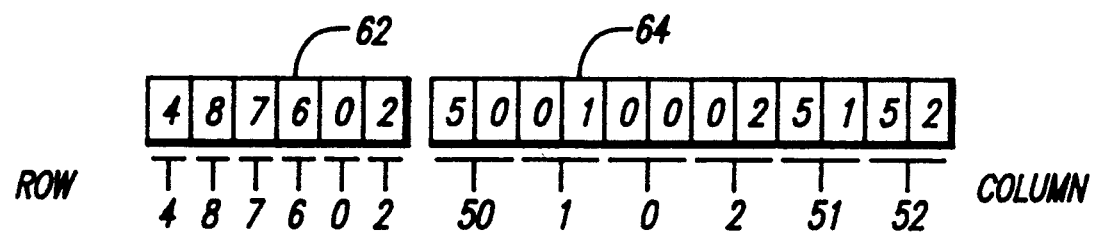
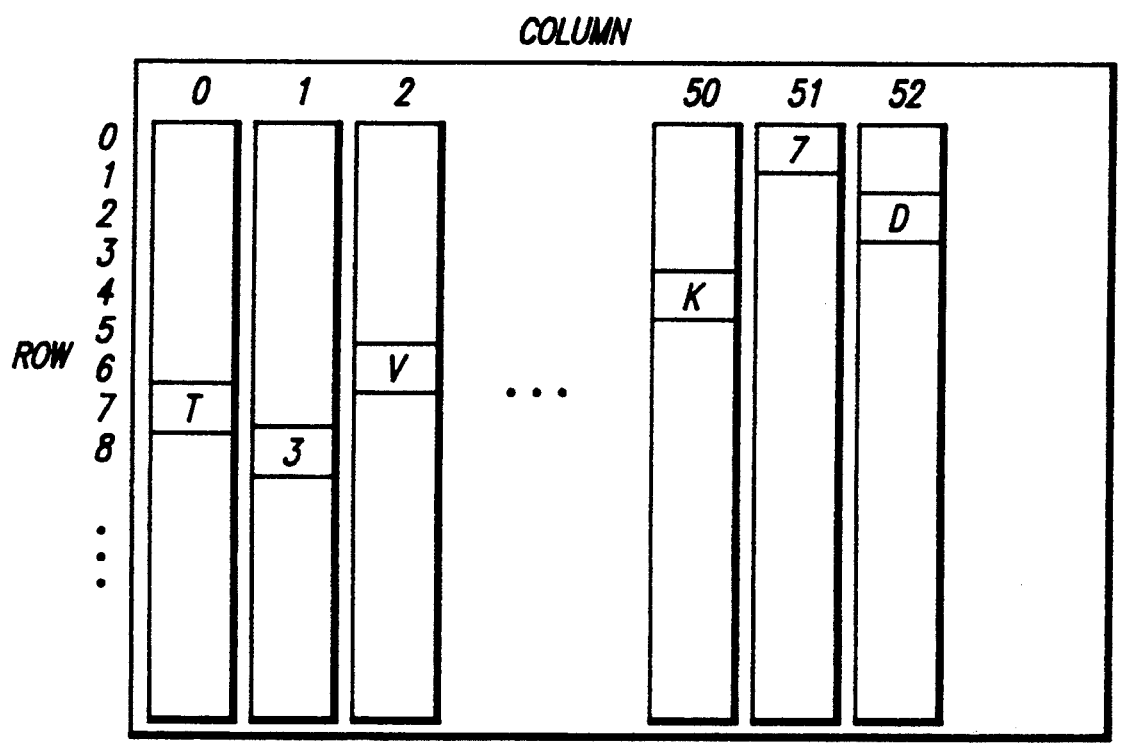
FIG. 4
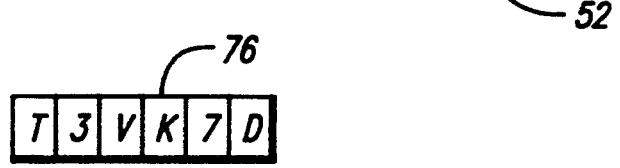

PERSONAL IDENTIFICATION ENCRYPTOR AND METHOD

BACKGROUND OF THE INVENTION

1. Field of the Invention

The present invention relates to secured transaction systems and more particularly to systems for encrypting a Personal Identification Number (PIN) from a remote site.

2. Description of the Related Art

Systems that are secured for use only by authorized individuals commonly rely upon a PIN that is assigned to, or selected by, the individual and which must be remembered by the individual for use in the system to verify his or her identity as an authorized user. For enhanced security against unauthorized users, a secured system should permit selection of a PIN by the authorized user rather having the PIN be assigned by, or otherwise known to, the authorizing institution that operates the secured system. Additionally, any use made of the PIN by the authorizing institution should ideally be only in encrypted form (i.e., encoded in a manner to mask the PIN) or within a security module so that the PIN of an authorized user is never available in unsecured form or in clear, readable text. Further, where large populations of users must be authorized to use the secured system, each user should be provided with a unique authorization by a scheme that is conducive to mass handling, with little opportunity for error and at low cost. In order to enhance security, the institution operating the secured system usually requires a record signature of the authorized user.

Conventional secured transaction systems typically assign a PIN or require the user to appear in person to select a PIN and to provide other information and the record signature. Alternatively, at least one existing secured transaction system allows the user to select a PIN from a remote location using a paper encryptor which is mailed or otherwise transmitted to the operator of the secured system without compromising the security of the PIN or other information about the user. Such a system is described in U.S. Pat. No. 4,870,683 to Atalla. The procedure described in this patent requires either clear text transfer of the user-selected PIN or that the user have one of the paper encryptors available to encrypt the PIN. Additionally, the user must typically wait several days or longer for the user-selected PIN to be activated by the operator of the secured system before access to the system is allowed.

SUMMARY OF THE INVENTION

In accordance with the present invention, a method and apparatus for allowing the user to select and encrypt a PIN from a remote location without requiring clear transfer of the user-selected PIN and the account number during a single communication, and without requiring the use of a special paper encryptor, is provided. The user places a telephone call to a system operator and is prompted through a sequence of steps. The user first transmits the desired PIN to the system using a touch-tone telephone keypad. In response, the system generates a unique sequence number and an encrypted PIN corresponding to the sequence number and transmits the sequence number and the encrypted PIN to the user. The system then ends the telephone call. The user then transmits the encrypted PIN, user account number and sequence number to the operator of the secured system, either by mail or telephone. If the encrypted PIN, user account information and sequence number are transmitted by telephone, the call is made to a different telephone number than the one called to obtain the encrypted PIN and sequence number. Thus, the user-selected (i.e. clear) PIN and user account number are never transmitted during a single communication.

The preferred embodiment of the encryptor includes a host computer system connected by a modem to a telephone line, along with appropriate communication software. The host computer system is also connected to a security module via a second, secure communication path. The security module generates the encrypted PIN using the user-selected PIN and the sequence number. The security module also processes the encrypted PIN and user account number to generate a Pin Verification Number (PVN), a Pin Verification Value (PVV) or an Offset. The PVN, PVV or Offset are then stored in a database for use by the secured system operator to provide subsequent authorization to a user. The security module is located in a secure room or vault, and processing is preferably done only in hardware to assure the security of the user-selected PIN. The PVN, PVV or Offset are then used by the transaction system on an ongoing basis to verify the identity of the authorized user.

Further features and advantages of the present invention will be appreciated by a review of the following detailed description of the preferred embodiment taken in conjunction with the following drawings.

BRIEF DESCRIPTION OF THE DRAWINGS

FIG. 4 is a functional block diagram which details the formation of the encrypted PIN;

DETAILED DESCRIPTION OF THE PREFERRED EMBODIMENTS

Figure 1:
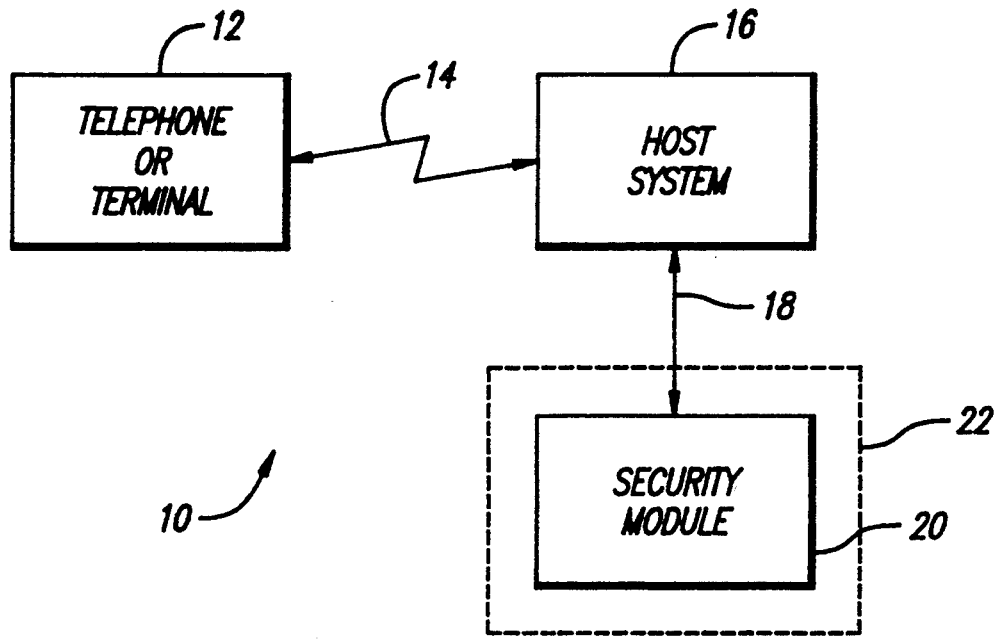
FIG. 1 is a simplified block diagram of a virtual encryption system constructed in accordance with the present invention.

Referring to FIG. 1, a simplified block diagram of a encryption system 10 constructed in accordance with the present invention is shown. Encryption system 10 includes a touch-tone telephone or data terminal 12, a communications path 14, a host computer system 16, a secure communications path 18 such as a fiber optic cable, and a security module 20 contained in a secured enclosure 22. The telephone or data terminal 12 provides the user with interactive electronic access to the host computer system 16. For example, a user may send information to the host computer system 16 including a user-selected PIN, an encrypted PIN, an account number and/or a sequence number using the telephone or data terminal 12. The user may also receive information from the host computer system 16 including the encrypted PIN and the sequence number. Communication capability between the telephone or data terminal 12 and the host computer system 16 are provided by the communications path 14.

The host computer system 16 is the communications manager for the encryption system 10. More particularly, the host computer system 16 prompts the user during the entry of each item of user information, and allows the information to be entered only in a manner which preserves the security of the encryption process. Similarly, when the host computer system 16 provides information to the user, it also does so in a manner which preserves the system security. For example, the host computer system 16 specifies each item of information to be entered by the user along with the format in which it is to be entered. In addition, the host computer system 16 will accept only items of information which it has specified. The specified information must be received by the host computer system 16 before the next item of information is specified. This interactive process continues until all of the required information has been received from the user.

In the preferred embodiment, the host computer system 16 has two operating modes. The first operating mode is directed to processing the user-selected PIN to generate the encrypted PIN, while the second operating mode is directed to processing the encrypted PIN to generate a Pin Verification Number (PVN) or other internal user authorization code. The detailed operation of each operating mode will be presented after the remaining structure of the encryption system 10 has been discussed.

Continuing with FIG. 1, the security module 20 is a dedicated computer system which is housed in a vault or other secured facility 22 in order to assure the integrity and security of its processing. All processing within the security module 20 is done in hardware so that the user-selected PIN is never available during decryption. Stated differently, the encrypting and decrypting algorithms used by the security module 20 consist of hardwired logic circuits and any intermediate data generated during processing is temporarily stored in hardware buffers. This means that the intermediate data cannot be accessed, displayed, stored or printed. All data and processing results are communicated between the host computer system 16 and the security module 20 via a secure communication path 18. Communication path 18 may include a point-to-point fiber optic-based link or other communication system which is resistant to unauthorized monitoring.

As with the host computer system 16, the security module 20 has two operating modes. The first operating mode processes the user-selected PIN and sequence number received from the host computer system 16 to form the encrypted PIN, both of which are then returned to the host computer system 16 for transmission to the user. The second operating mode processes the encrypted PIN and the user account number to form the PVN or other internal user authorization code. The PVN or other internal user authorization code is then stored in association with the particular user's identifying data (name, account number, etc.), and the user is thereby signed into the system for subsequent verifications of the user's identity by comparison's of PVN's using commonly known identifying procedures. For example, in one such procedure when the user enters his or her PIN in order to gain access to the system, the PIN is converted to the corresponding PVN and compared with the stored PVN. The user is granted access to the system only if the PVN's match.

Figure 2:
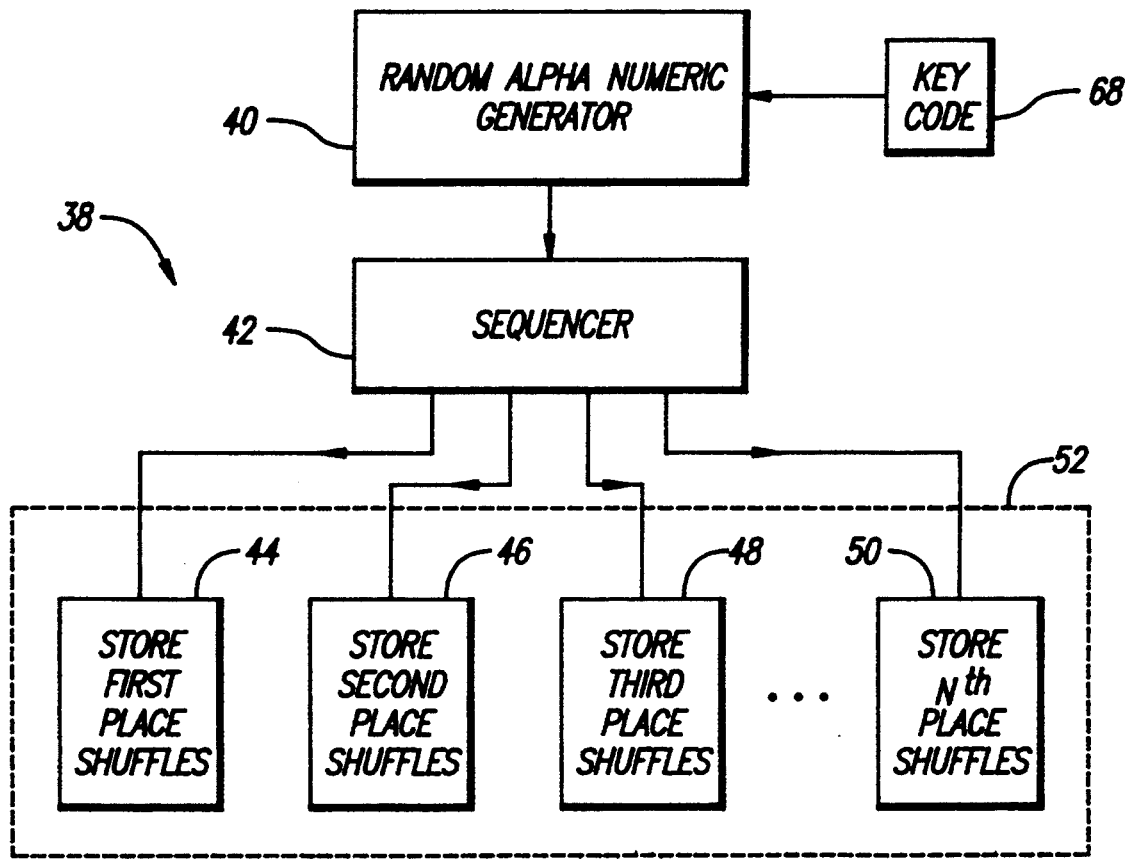
FIG. 2 is a block diagram of a of an embodiment of the virtual encrypting system for preparing tables of shuffled (i.e. random) alphanumeric characters.

FIG. 2 shows a block diagram of an embodiment of an encrypting system 38 for off-line preparation of tables of shuffled (i.e. random) alphanumeric characters which are used by the security module 20 both to generate the encrypted PIN and to decrypt the encrypted PIN to generate the PVN. The term "off-line" is used to indicate that a relatively large number of such tables of alphanumeric characters are often (though not always) prepared in advance and stored for later use in encrypting and/or decrypting PIN's. The encrypting system 38 includes a random alphanumeric generator 40 and a key code 68 for generating pseudo-random alphanumeric characters, and a shuffle table 52 having a plurality of memory elements 44–50 (i.e. "columns") for storing the alphanumeric characters.

The random alphanumeric generator 40 may be a conventional hardware or software random number generator including a conventional Data Encryption Standard (DES) integrated circuit (available from Advanced Micro Devices, Inc., Sunnyvale, Calif.) which operates on numerical and numeric-equivalents of alphabetical characters to generate random shuffles of alphanumeric characters. The key code 68 acts as a character "seed" which causes the alphanumeric generator 40 to generate a unique pseudo-random sequence of alphanumeric characters. Thus, different key codes will result in generation of different pseudo-random sequences.

For example, sixteen different alphanumeric shuffles, each with a corresponding key code 68, are stored in the memory 44 of the shuffle table 52. More particularly, each of the alphanumeric characters is stored in a unique location within the memory 44, with the locations being addressable by specifying column and position values. Similarly, sixteen different alphanumeric shuffles are generated and stored in each of the memories 46 through 50 of the shuffle table 52. Sequencer 42, which may be a conventional scanner or multiplexer, is connected to apply the random alphanumeric shuffles from the generator 40 to each of the memories 44–50 to store the required number of alphanumeric shuffles and the associated key codes in each of the memories 44–50. The memories 44–50 containing the stored information constitute a shuffle table 52 which is unique and which can be used to generate the encrypted PIN and/or the PVN.

Figure 3:
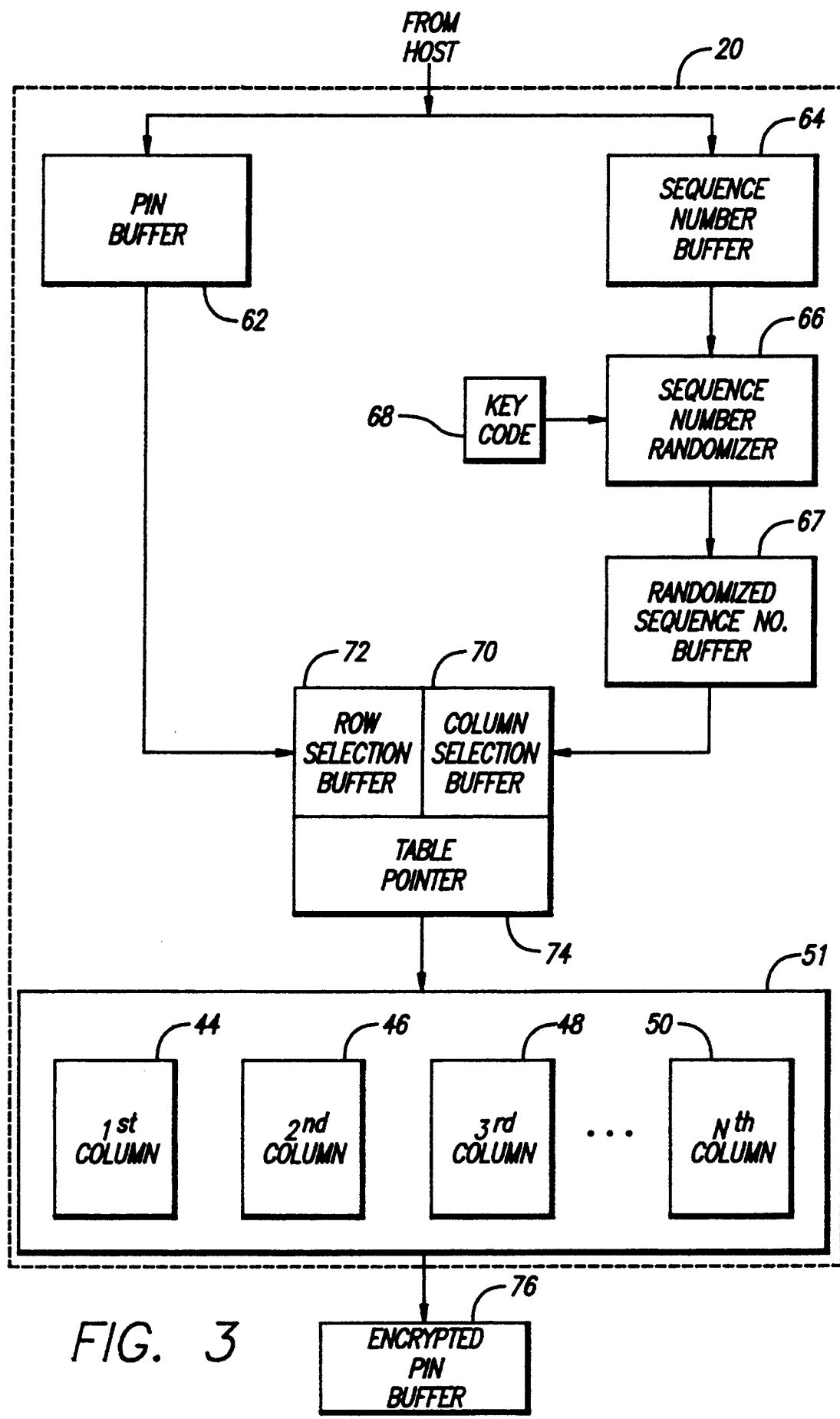
FIG. 3 is a more detailed functional block diagram of one embodiment of the virtual encryption system for processing PIN, sequence number and account number information.

Referring to FIG. 3, a more detailed functional block diagram of one embodiment of the security module 20 that operates on the user-selected PIN and the sequence number to generate the encrypted PIN is illustrated. The embodiment shown in FIG. 3 includes a PIN buffer 62, a sequence number buffer 64, a sequence number randomizer 66 and key code 68 (which could be the same key code as described in FIG. 2), a randomized sequence number buffer 67, a table pointer 74 in the form of a buffer having a row selection buffer 72 and a column selection buffer 70, a memory 51 containing a portion of the shuffle table 52 of FIG. 2 in the form of a random access memory (RAM) containing selected columns of alphanumeric characters, and an encrypted PIN buffer 76.

The generation of the encrypted PIN is now discussed with reference to FIGS. 3 and 4. When generating the encrypted PIN, the user-selected PIN and sequence number are received from the host 16 and are stored respectively in the PIN buffer 62 and sequence number buffer 64. The sequence number is provided to the sequence number randomizer 66 along with the key code 68. The sequence number randomizer 66 uses the key code 68 to generate a randomized sequence number which is stored in randomized sequence number buffer 67. The randomized sequence number is then used to select particular columns of shuffle table 52 which are copied to the memory 51. Stated differently, the randomized sequence number effectively forms a unique encrypting table (i.e. the memory 51) by selecting particular columns of alphanumeric characters from shuffle table 52.

Referring to FIG. 4, in one embodiment the individual digits of the randomized sequence number are paired to form a number which is used to select the particular column of the shuffle table 52. For example, the first two digits "5" and "0" are paired to select column "50". Similarly, the next two digits "0" and "1" are paired to select column "01" and so on until all of the digits of the sequence number have been used. Note that this approach is not the only one that could be used to select the columns (i.e. individual digits or other combinations of digits could be used).

Continuing with FIG. 4, the individual alphanumeric characters of the user-selected PIN are used to select the positions within of one of the selected columns of the memory 51. For example, the first digit "4" is used to select position "4" of column "50" while the second digit "8" is used to select position "8" of column "01". As with the selection of columns, this method of selecting positions within the rows is not unique, and many other schemes are possible.

Corresponding to each selected column and position is a random alphanumeric character which was generated and stored as described above in connection with FIG. 2. The stored alphanumeric characters corresponding to the selected columns and positions are combined to form the encrypted PIN, which is placed in encrypted PIN buffer 76.

Figure 5:
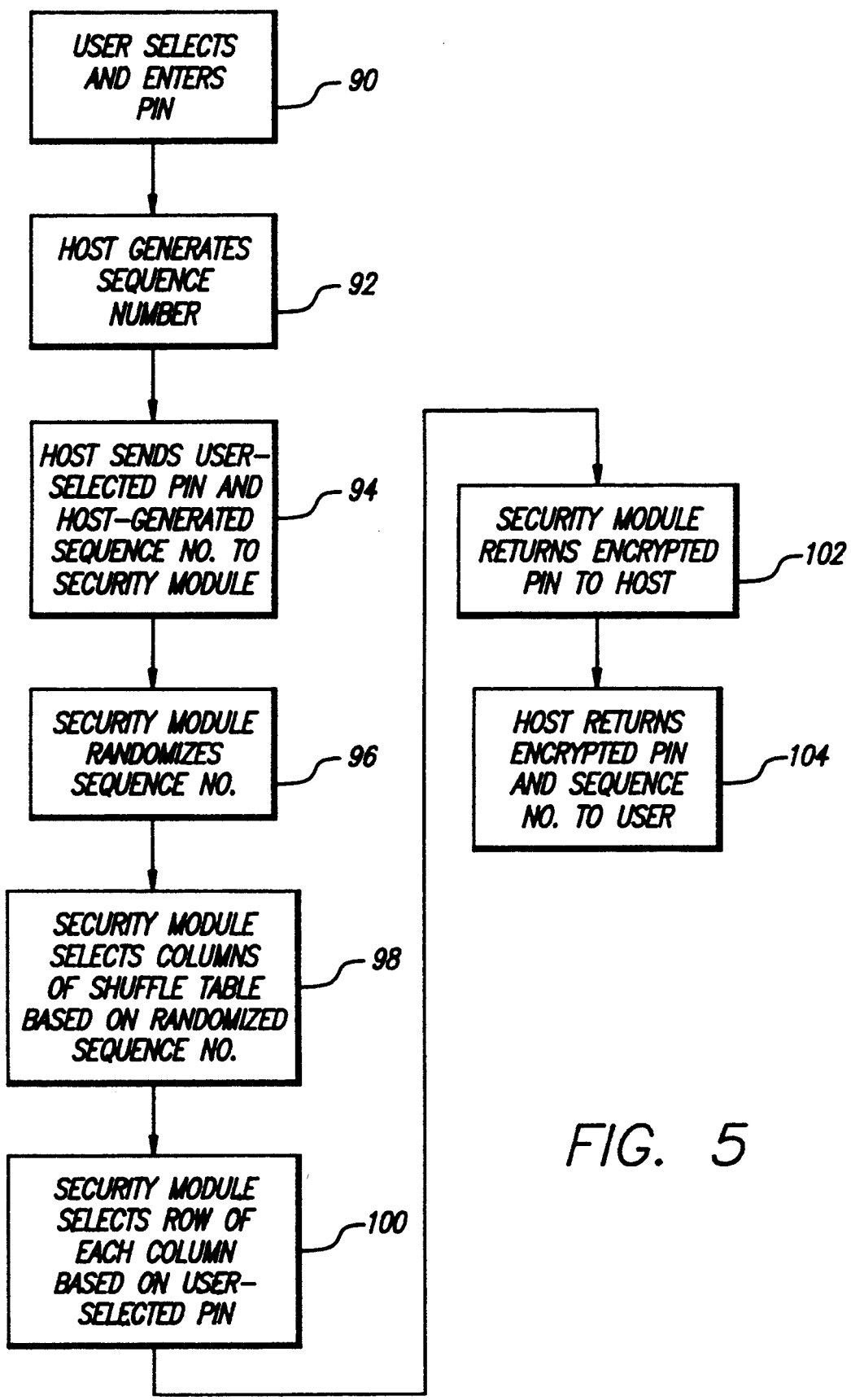
FIG. 5 is a flowchart which illustrates the steps for generating the encrypted PIN and sequence number.

Turning now to FIG. 5, a flowchart which provides another illustration of the steps for generating the encrypted PIN and sequence number is provided. The process begins at step 90 by selection and entering of the user-selected PIN. Processing continues at steps 92 and 94 by the host computer system 16 generating and forwarding a sequence number and the user-selected PIN to the security module 20. At step 96, the security module 20 randomizes the sequence number using a key code, and at step 98 the randomized sequence number is used to select the columns 44-50 of the shuffle table 52. Similarly, the security module 20 also selects the positions of each column at step 100 based in the user-selected PIN. Continuing with step 102, the security module 20 combines the stored alphanumeric characters to form the encrypted PIN and returns the encrypted PIN to the host computer system 16. At step 104, the host computer system 16 then returns the encrypted PIN (shown as "K3TV7D" in buffer 76 of FIG. 4), along with the sequence number to the user.

Figure 6:
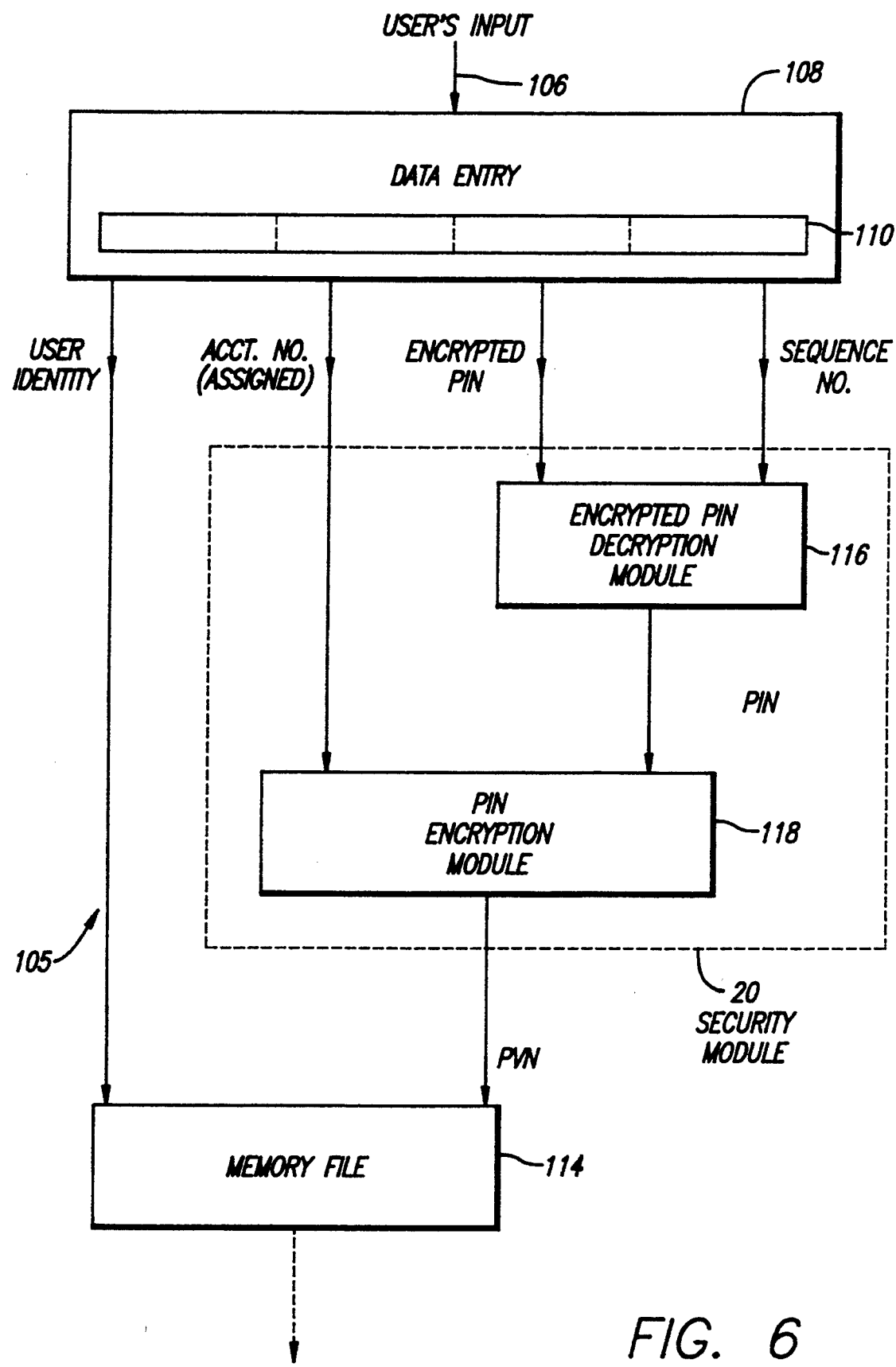
FIG. 6 is a functional block diagram of one embodiment of the virtual encryption system that operates on the encrypted PIN and user account number for the purpose of authorizing a new user.

Referring to FIG. 6, a functional block diagram of one embodiment 105 of an encryption system 10 that operates on the encrypted PIN and user account number for the purpose of authorizing a new user is provided. The user communicates information 106 to a system operator via any suitable channel such as telephone or mail. Conventional data entry apparatus 108 assembles a code word 110 from the information 106 having portions or fields associated with the user's name or identity, the user's assigned account number, the encrypted PIN, and the host generated sequence number.

The sequence number is used to identify the same columns of alphanumeric characters that were used during the encryption process. Specifically, in the encrypted PIN decryption module 116 the sequence number is again randomized using the same key code to select the same columns of alphanumeric characters of the table 52 used to form the encrypted PIN, and the columns are then searched to locate the corresponding characters of the encrypted PIN. Using the above example encrypted PIN "K3TV7D", column "50" is searched to locate the character "K" and the corresponding location (i.e. position "4" in the column) becomes the first character of the user-selected PIN. Similarly, column "01" is searched to locate the character "3" and the corresponding position "8" becomes the second character of the user-selected PIN, and so on for each character of the encrypted PIN. The encrypted PIN is thus decrypted to obtain the user-selected PIN which is available only as circuit signals within the hardware of the security module 20. The user-selected PIN is then re-encrypted by the PIN encryption module 118, this time using the assigned account number in place of the sequence number, to obtain the PVN. The PVN is stored in a memory file 114 in association with the particular user's identifying data, and the user is thereby signed onto the system for subsequent verifications of the user's identity by comparisons of PVN's using, for example, the above mentioned identity checking procedure.

Therefore, the virtual encryption system of the present invention greatly facilitates the sign-on procedures for new users of a computer-oriented security system by enabling remotely located current and prospective users to access the authorization procedure without requiring the use of a physical encryption device.

The foregoing description of the present invention is of a preferred embodiment which is subject to a number of modifications while staying within the spirit and scope of the invention. Accordingly, the foregoing description of the preferred embodiment should only be viewed as illustrative and limited only by the following claims.

What is claimed is:

1. An encryption system for designating an identification number via electronic communication between a remote user and said encryption system, said identification number for use with a user account number to access a secure transaction system, said encryption system comprising:

a first processing system for controlling an electronic communication between said remote user and said encryption system including:

electronic receiving means for receiving said identification number transmitted electronically from said remote user;

means for generating a user sequence code;

means for transmitting an encrypted identification number and said user sequence code to said remote user; and a second processing system for processing said identification number and said user sequence code to form said encrypted identification number, said second processing system including:

means for receiving said identification number and said user sequence code from said first processing system;

encryption means for forming said encrypted identification number;

means for transmitting said encrypted identification number to said first processing system.

2. The encryption system of claim 1 wherein said second processing system further comprises:

means for processing said encrypted identification number to form a personal verification number, said personal verification number for allowing said remote user access to said secure transaction system.

3. The encryption system of claim 1 wherein said second processing system further comprises:

means for generating a plurality of arrays of alphanumeric characters, said means for generating a plurality of arrays comprising:

means for generating random characters; and an electronic storage table comprising:

a plurality of memory elements for storing said arrays of alphanumeric characters, each of said memory elements comprising:

a plurality of addressable storage locations, each of said addressable storage locations being adapted to store at least one of said alphanumeric characters.

4. The encryption system of claim 3 wherein said second processing system further comprises:

means for addressing each of said addressable storage locations to access said alphanumeric characters stored therein, wherein said means for addressing comprises means for selecting an addressable storage location to be addressed based upon said encrypted identification number and said user sequence code.

5. A method for encrypting an identification number utilizing input from a remote user in communication with an encryption system, said encryption system comprising a computer, said computer comprising an electronic storage table containing a plurality of memory elements, wherein each memory element includes a plurality of storage locations, wherein each of said storage locations comprising means for storing at least one randomly selected alphanumeric character, said method comprising the steps of:

receiving an unencrypted identifier code;

generating a sequence code;

forwarding said sequence code and said unencrypted identifier code to said computer;

randomizing said sequence code using a key code;

selecting at least one of said memory elements using said randomized sequence code;

selecting a storage location from each of the memory elements selected in said selecting at least one of said memory elements step, said selection of storage locations being informed by said unencrypted identifier code, each of said storage locations comprising at least one alphanumeric character; and forming an encrypted identifier code using said alphanumeric characters.

6. A method for generating encrypted identification code information including encrypted identifier codes comprising the steps of:

sending an unencrypted identifier electronically to a host computer from a remote user;

receiving said unencrypted identifier in said host computer;

generating an internal code in said host computer;

transmitting said internal code from said host computer to a processing system;

generating encrypted identification code information in said processing system;

transmitting said encrypted identification code information to said host computer from said processing system; and transmitting said encrypted identification code information to said remote user from said host computer.

7. The method of claim 6 wherein:

said generating an internal code in said host computer step further comprises generating a sequence code;

said transmitting said internal code from said host computer step further comprises forwarding said sequence code and said unencrypted identifier to said processing system, wherein said processing system comprises a computer comprising an electronic storage table comprising a plurality of memory elements wherein each of said memory elements comprises a plurality of storage locations for storing random alphanumeric characters;

said generating an encrypted identification code step further comprises:

randomizing said sequence code using a key code, creating a randomized sequence code;

selecting at least one memory element using said randomized sequence code;

selecting a storage location from each of said selected memory elements, said selecting a storage location being based upon said unencrypted identifier, each of said selected storage locations comprising at least one alphanumeric character; and forming said encrypted identification code based upon said alphanumeric characters.

8. The method of claim 6 further comprising the steps of:

sending said encrypted identification code information from said remote user to a system operator;

transmitting said encrypted identification code information from said system operator to a computer system using a transmission means, said transmission means comprising a data entry means; and making an approval decision based upon said encrypted identification code information and upon previously stored information.

9. The method of claim 6 wherein said sending an unencrypted identifier step comprises sending said unencrypted identifier using telephone transmission, said telephone transmission comprising entering said unencrypted identifier using a telephone touch tone keypad.

10. The method of claim 6 wherein said generating an internal code step comprises generating said internal code based upon said unencrypted identifier.

11. The method of claim 10 wherein said internal code comprises said unencrypted identifier and a sequence code.

12. The method of claim 6 wherein said transmitting said internal code step comprises transmitting said internal code over a secure data transmission path.

13. The method of claim 6 wherein said generating an encrypted identification code step comprises generating an encrypted identification code based upon said unencrypted identifier.

14. The method of claim 13 wherein said transmitting said encrypted identification code to said remote user step comprises transmitting said encrypted identification code and a sequence code.

15. An encryption apparatus comprising:
an electronic communication means for generating a first unencrypted communication signal;
a first receiving means for receiving said first unencrypted communication signal from said electronic communication means;
generating means for generating at least one encrypted identifier array of alphanumeric characters responsive to the first communications signal, said generating means being connected to said first receiving means; and
transmission means for transmitting a second communication signal to said electronic communication means, said second communication signal comprising said encrypted identifier array.

16. The encryption apparatus of claim 15 further comprising:
a second receiving means for receiving said second communication signal;
a second transmission means for transmitting said second communication signal to said generating means;
said generating means comprising approval means for making an approval decision based upon said second communication signal and for accessing previously stored information pertaining to said approval decision.

17. The encryption apparatus of claim 15 wherein said electronic communication means comprises a telephone, said telephone comprising a keypad.

18. The encryption apparatus of claim 15 wherein said first unencrypted communication signal comprises an unencrypted PIN.

19. The encryption apparatus of claim 15 wherein:
said first communication signal comprises a personal identifier code; and
said generating means comprises:
a host computer means connected to said receiving means and comprising:
means for generating a sequence code; and
communication means for sending at least said sequence code and said personal identifier code to a processing means and for receiving information said processing means.

20. The encryption apparatus of claim 19 wherein said processing means further comprises:
means for generating a key code;
randomizing means for generating a randomized sequence code in response to said key code, said randomizing means being connected to said means for generating a key code;
an electronic storage table comprising a plurality of memory elements wherein each of said memory elements comprises a plurality of storage locations for storing random alphanumeric characters;
means for selecting at least one memory element using said randomized sequence code;
means for selecting a storage location from each of said selected memory elements based upon said unencrypted identifier code, each of said selected storage locations comprising an alphanumeric character; and
forming said encrypted identification code based upon said alphanumeric characters.

21. An encryption apparatus comprising:
means for sending an unencrypted identifier electronically to a host computer from a remote user;
means for receiving said unencrypted identifier in said host computer;
means for generating an internal code in said host computer;
means for transmitting said internal code from said host computer to a processing system;
means for generating encrypted identification code information in said processing system;
means for transmitting said encrypted identification code information to said host computer from said processing system; and
means for transmitting said encrypted identification code information to said remote user from said host computer.

* * * * *